United States Patent Office 3,217,053
Patented Nov. 9, 1965

3,217,053
ALKYLATION OF AROMATICS
Stephen M. Kovach, Highland, Ind., and Glenn O. Michaels, Park Forest, Ill., assignors to Sinclair Research, Inc., Wilmington, Del., a corporation of Delaware
No Drawing. Filed Jan. 5, 1962, Ser. No. 164,602
7 Claims. (Cl. 260—671)

This invention relates to the alkylation of aromatics with alkylating agents and is particularly concerned with an alkylation process conducted in the presence of an alkylation catalyst comprising boria or chromia-boria and phosphorus pentoxide on a calcined alumina support.

Alkylated aromatics are of value in many fields and some are particularly desirable as constituents of high octane aviation fuels and as sources of synthetic detergents. Although catalytic processes for the alkylation of aromatics have been suggested, the present process provides good utilization of alkylating agents, low carbon yields thus less carbon laydown on the catalyst, good catalyst aging characteristics, low disproportionation or isomerization, and a readily regenerable catalyst.

The alkylation is accomplished in the present process by employing a particularly effective catalyst composition comprising boria or chromia-boria and phosphorus pentoxide an on alumina suport. By adding boria or chromia-boria, the phosphorus pentoxide is believed to be stabilized through complex or compound formation. Boria with phosphorus pentoxide would form boron phosphate and chromia-boria is believed to form some form of a heteropolyacid. Boria is present in catalytic amounts generally from about 0.1 to 10, preferably from about 1 to 10 weight percent; chromia, when used, in catalytic amounts generally from about 0 to 20, preferably from about 0 to 10 weight percent and phosphorus pentoxide in catalytic amounts from about 0.1 to 20, preferably from about 1 to 20 weight percent on an alumina support. The natural or synthetic aluminas can be employed as the inert carrier of the catalyst but a highly preferred base is an activated or gamma alumina such as those derived by calcination of amorphous hydrous alumina, alumina monohydrate, alumina trihydrate or their mixtures.

Activated or gamma alumina is made by calcining a precursor predominating in alumina trihydrate. An alumina of this type is disclosed in U.S. Patent No. 2,838,444. The alumina base is derived from a precursor alumina hydrate composition containing about 65 to 95 weight percent of one or more of the alumina trihydrate forms, gibbsite, bayerite I and bayerite II (randomite) as defined by X-ray diffraction analysis. The substantial balance of the hydrate is amorphous hydrous or monohydrate alumina. Trihydrates are present as well-defined crystallites, that is, they are crystalline in form when examined by X-ray diffraction means. The crystalline size of the precursor alumina trihydrate is relatively large and usually is in the 100 to 1000 Angstrom unit range. The calcined alumina has a large portion of its pore volume in the pore size range of about 100 to 1000 Angstrom units generally having about 0.1 to about 0.5 volume in this range. As described in the patent the calcined catalyst base can be characterized by large surface area ranging from about 350 to about 550 or more square meters/gram when in the virgin state as determined, for example, by the BET adsorption technique. A low area catalyst base prepared by treating the predominantly trihydrate base precursor is described in U.S. Patent No. 2,838,445. This base when in the virgin state has substantially no pores of radius less than about 10 Angstrom units and the surface area of the catalyst base is less than about 350 square meters/gram and most advantageously is in the range of about 150 to 300 square meters/gram. The alumina base can contain small amounts of other solid oxides such as silica, magnesia, natural or activated clays (such as kaolinite, montmorillonite, halloysite, etc.), titania, zirconia, etc. The total amount of such promoters generally not exceeding about 20 percent by weight for instance about 0.1 to 10 weight percent.

The metal components can be added to the alumina catalytic support by known procedures involving impregnation using a water-soluble salt of the catalytic component or by precipitation or co-precipitation. The support can be impregnated with the active oxides simultaneously or singly in any order. The boria can be added to the catalyst in any stage of its preparation. It may be incorporated in the support, for instance, by precipitation, co-precipitation, impregnation, and mulling either before or after the addition of the phosphorus pentoxide. It can also be applied by impregnation from solution (water, organic or inorganic solvents) or from a gas phase. However, it is frequently added to the catalyst after it has been formed by tabletting or extrusion and calcined.

Phosphorus pentoxide is advantageously incorporated with the alumina base by impregnating the alumina with an aqueous solution containing a water-soluble compound containing $P_2O_5$, such as orthophosphoric acid, ammonium di-hydrogen phosphate, $NH_4H_2PO_4$, diammonium hydrogen phosphate $[(NH_4)_2HPO_4]$, and other water-soluble phosphates which upon heating will leave a residue of $P_2O_5$ amounting up to about 20% by weight of the alumina base. After impregnation any excess liquid is removed and the catalyst composition is dried by heating and calcined. Free acids of phosphorus should not be present in the final composition and if necessary the calcined composition should be washed to insure their absence.

When chromia is to be used as an active component of the alumina base, the chromia component of the catalyst of the present invention is added to the base in catalytic amounts by known procedures involving impregnation or coprecipitation. Suitable water-soluble compounds include chromium nitrate, chromic acid, chromic sulfate and chromium chloride, but the nitrates have the advantage in that they decompose to the oxides after calcination without leaving a residue which is difficult to wash out. When employing the impregnation procedure the resulting impregnated product is dried generally at a temperature within the range of about 170° F. to 400° F. for at least 6 hours and up to 24 hours or more with a stream of air circulated to carry off the water vapor. The dried catalyst mixture then may be formed by a tabletting or extruding operation. If the catalyst is to be in finely divided form, a grinding operation may follow drying. In the case of tabletting, it is customary to incorporate a die lubricant which advantageously is organic and can be burned out by oxidation in the calcination step.

The dried pellets are suitable for subjection to high temperature treatment or calcination at a temperature between about 500° F. and about 1500° F., usually between about 700° F. and 1000° F., for instance, for a period of between about 2 and about 36 hours. It is generally preferred that the calcining operation be conducted in a manner minimizing contact time of the alumina-containing product with water vapor at the high temperatures encountered. The product after drying generally contains a substantial amount of water which is driven off at temperatures above about 400° F. It is usually preferred to heat the alumina-containing composite at a rate of 2 to 20° F. per minute up to about 600° F. with an air flow through the catalyst bed followed by heating at a slower rate to the final calcination temperature within the range of about 700° F. to 1500° F. especially if an organic die lubricant is to be oxidized without localized overheating. While the calcination or heat treatment will generally be conducted in air, it is also feasible, although generally less desirable, to carry out the same in other oxidizing atmospheres, a reducing atmosphere such as for example, hydrogen or methane, or an inert atmosphere, such as nitrogen. In some instances, it may be desirable to carry out the calcination initially in a blend of air and nitrogen. The alumina impregnated with the catalytically active components, is finally cooled to yield the finished product.

The alumina based catalyst can be activated during processing on stream, it can be pre-reduced or pre-activated. Pre-activation can be accomplished by treatment with hydrogen at an elevated temperature, for instance about 800 to 1000° F. The catalyst employed in the process of the present invention can be easily regenerated employing conventional procedures, for instance by subjecting it to an oxygen-containing gas at temperatures sufficient to burn off carbon deposited on the catalyst during the alkylation. This oxygen-containing gas, e.g. an oxygen-nitrogen mixture, can contain about 0.01 weight percent to 5 weight percent oxygen but preferably contains about 0.5 to 1.5 weight percent oxygen and is introduced at a flow rate such that the maximum temperature at the site of combustion is below about 1000° F.

The alkylation reaction conditions used in the method of the present invention generally include a temperature sufficient to maintain the aromatic and alkylating agent feeds in the vapor phase under the pressure employed. This temperature may be from about 400 to 1000° F., preferably from about 500 to 800° F. while the pressure may range from about ambient pressures or less up to about 2000 p.s.i.g., e.g. about 0 to 2000 p.s.i.g., and are preferably elevated pressures ranging from about 50 to 1000 p.s.i.g. The catalyst can be used as a fixed, moving or fluidized bed or in any other convenient type of handling system. The aromatic space velocity will in most cases be from about .001 to 10, preferably from about 0.01 to 5, weights of aromatic per weight of catalyst per hour (WHSV). The alkylating agent is generally employed in a molar ratio to the aromatic of about 0.1 to 4:1 and preferably of about 1 to 2:1. Specific illustrations include a methanol to aromatic ratio generally of about 0.25 to 4:1, preferably about 1 to 4:4 and a dimethyl-ether ratio generally of about 0.125 to 2:1, preferably about 1 to 8:8. Diluent gases, e.g. inert or hydrocarbon, such as $H_2$, $N_2$ and $CH_4$ can also be utilized in the present process usually in the amounts ranging from a diluent gas to alkylating agent molar ratio will usually be from about 0.01 to 20:1 or more, preferably about 2 to 10:1.

The aromatics, e.g. alkylatable aromatic hydrocarbons, suitable for alkylation in the present process include mono- and polycyclic aromatic hydrocarbon compounds such as benzene and its lower alkyl homologues, e.g. toluene and the xylenes, naphthalene, and indane, which may be substituted or unsubstituted. The substituted aromatic compounds must, however, contain at least one hydrogen attached to the aromatic nucleus and are preferably methyl-substituted. These compounds may correspond to the general formula

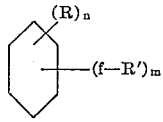

where R is an alkyl, including cyclo alkyl, radical containing generally from about 1 to 20, preferably from about 1 to 8, carbon atoms; $n$ is 0 to 3 or 5; R' is an aromatic hydrocarbon ring, preferably $C_4H_4$; —$f$— indicates a fused ring relationship (two carbon atoms common to two aromatic nuclei, e.g. as in naphthalene); and $m$ is generally 0 to 1 or more. R may also be a divalent hydrocarbon group attached to the aromatic ring at two carbon atoms of the ring, e.g. alkylene, as in decalin and tetralin. The preferred aromatics, however, include alkyl benzenes corresponding to the above formula when $m$ is 0. The aromatic rings and R groups may be substituted as with phenyl, hydroxy, alkoxy, halide and other radicals which do not prevent the desired reaction. Suitable aromatic hydrocarbons include benzene, toluene, ortho-xylene, meta-xylene, para-xylene, ethyl benzene, ortho-ethyltoluene, meta-ethyltoluene, para-ethyltoluene, 1,2,3-trimethylbenzene, 1,2,4-trimethylbenzene, 1,3,5-trimethylbenzene or mesitylene, normal propylbenzene, isopropylbenzene, etc. Higher molecular weight alkylaromatic hydrocarbons are also suitable as starting materials and include aromatic hydrocarbons such as are produced by the alkylation of aromatic hydrocarbons with olefin polymers. Such products are frequently referred to in the art as alkylate, and include hexylbenzene, nonylbenzene, dodecylbenzene, pentadecylbenzene, hexyltoluene, nonyltoluene, dodecyltoluene, pentadecyltoluene, etc. Very often alkylate is obtained as a high boiling fraction in which the alkyl group attached to the aromatic nucleus varies in size from about $C_9$ to about $C_{18}$. Other suitable alkylatable aromatic hydrocarbons include those with two or more aryl groups such as diphenyl, diphenylmethane, triphenyl, triphenylmethane, fluorene, stilbene, etc. Examples of other alkylatable aromatic hydrocarbons containing condensed benzene rings include naphthalene, alpha - methylnaphthalene, beta-methylnaphthalene, anthracene, phenanthrene, naphthacene, rubrene, etc. The above alkylatable aromatics can be used alone or in mixtures.

The alkylating agents suitable for use in the present process include organic compounds containing an alkyl, including cycloalkyl, radical which is transferable to the aromatic nucleus. These compounds are aliphatic and include alkyl halides, alkanols and ethers generally containing from about 1 to 20 carbon atoms, preferably from about 1 to 6 carbon atoms, and also contain a radical, e.g. an hydroxyl or ether radical; which will displace a nuclear hydrogen of the aromatic through condensation. The alkylation agent is preferably saturated and frequently contains oxygen which produces water during the alkylation reaction.

A number of suitable alkylating agents correspond to the general formula $$R—O—R'$$

where R is a monovalent hydrocarbon radical such as alkyl, including cycloalkyl, usually lower alkyl and preferably containing 1 to 4 carbon atoms and R' is hydrogen or R, such as a lower alkyl radical and preferably containing 1 to 4 carbon atoms. The alkylating agents usually do not have more than about 18 carbon atoms, preferably up to about 12 carbon atoms. Specific alkylating agents include alkanols such as ethanol, propanol, isopropanol, pentanol, octanol and preferably methanol and alkyl ethers such as dimethyl ether, diethyl ether and like members whether substituted with non-interfering groups or not. When the alkanols are employed, they may go through an intermediate ether stage. Examples of alkyl halides which may be used are of the formula RX, where R is as noted above and X is halogen and include ethyl chloride, normal propyl chloride, isopropyl chloride, normal butyl chloride, isobutyl chloride, secondary butyl chloride, tertiary butyl chloride, amyl chlorides, hexyl chlorides, etc., ethyl bromide, normal propyl bromide, isopropyl bromide, normal butyl bromide, isobutyl bromide, secondary butyl bromide, tertiary butyl bromide, amyl bromides, hexyl bromides, etc., ethyl iodide, normal propyl iodide, etc.

The following specific examples will serve to illustrate the present invention but are not to be considered as limiting.

PREPARATION OF CATALYST (A) 433 grams of a calcined alumina support having a hydrate composition comprising about 42% bayerite, 18% randomite, 11% gibbsite, 20% boehmite and 9% amorphous as determined by X-ray diffraction analysis are added into a 6" crystallizing dish. 46 grams of H₃BO₃ and 90 grams of 85% H₃PO₄ are dissolved in 410 ml. of distilled water at 194° F. and poured over the pellets and stirred thoroughly. The catalyst is placed in a forced air drying oven, set at 284° F. for 4 hours. The catalyst is stirred occasionally while drying. The oven dried catalyst is transferred to a sagger and placed in a muffle furnace preheated to 1000° F. The catalyst is held at 1000° F. for 2 hours and cooled in a desiccator. The calcined catalyst contained 3% by weight of boria ($B_2O_3$ and 5% by weight $P_2O_5$.

(B) A second 433 gram sample of the calcined alumina from A are weighed into a 6" crystallizing dish. 55 grams of H₃BO₃, 108 grams of 85% H₃PO₄ and 50 grams of CrO₃ are dissolved in 410 ml. of distilled water at 194° F. and poured over the pellets and stirred thoroughly. The mixture is dried at 194° F. and then calcined for 2 hours in a muffle furnace at a temperature of about 1000° F. The calcined catalysts contained about 4% by weight of boria ($B_2O_3$), 6% by weight of $P_2O_5$ and 5% by weight chromia ($Cr_2O_3$), based on the alumina.

The examples are conducted according to the following procedure. A 1-inch internal diameter Universal stainless steel reactor heated by radiant heat and bronze-block furnace is employed. The temperature of the reactor is controlled by Fenwall thermostats and the temperature of the catalyst bed is measured by means of Iron-Constantan thermocouples located throughout the bed.

*Examples*

Ortho-xylene and methyl alcohol are blended in the ratios indicated in Table I below and charged to the reactor from a graduated blowcase by a diluent gas placement. Both the diluent gas and the liquid feed are metered to the reactor through Fischer-Porter rotameters.

The liquid products are separated from the effluent gases in a Jerguson liquid-level gauge and then released to atmospheric pressure at room temperature. The volume of dry gas is measured by means of a wet test meter and spot and continuous gas samples are taken. The gas samples are analyzed by mass spectrometer techniques. Total hydrocarbon analyses are by vapor phase chromatography. The examples are conducted under the conditions specified in Table I. Table I also presents comparative results using catalysts comprising phosphoric acid on kieselguhr, boria and phosphorus pentoxide on alumina and chromia-boria-phosphorus pentoxide on alumina.

However, when boria and chromia-boria are added to a phosphorus pentoxide-activated alumina catalyst the phosphorus pentoxide is stabilized and high methanol utilization is maintained and a low coking rate is obtained. This lower coking rate gives a cycle time of twelve to twenty-four hours depending upon the methanol ratio employed.

It is claimed:
1. A process for the alkylation of aromatic hydrocarbons, which correspond to the structural formula

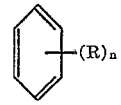

wherein R is an alkyl radical containing from 1 to 8 carbon atoms and $n$ is a number from 0 to 3, with an alkylating agent which corresponds to the general formula R—OR′, wherein R is an alkyl radical containing from 1 to 4 carbon atoms and R′ is hydrogen or R, at a temperature of about 500 to 800° F., a pressure of about 50 to 1000 p.s.i.g. and in the presence of a catalyst consisting essentially of a major amount of a calcined alumina base and a minor amount of the reaction product of boria and phosphorus pentoxide, said boria constituting about 0.1 to 10 weight percent of the catalyst and said phosphorus pentoxide constituting about 0.1 to 20 weight percent of the catalyst.

2. The process of claim 1 wherein the alkylating agent is an alkanol of 1–4 carbon atoms.

3. The process of claim 1 wherein the reaction product contains chromia, said chromia constituting a catalytic amount up to about 20 weight percent of the catalyst.

4. The process of claim 3 wherein the catalyst consists essentially of a major amount of an activated alumina base and the reaction product of boria, chromia and phosphorus pentoxide, said boria constituting about 1 to 10 weight percent of the catalyst, said chromia constituting a catalytic amount up to about 10 weight percent and said phosphorus pentoxide constituting about 1 to 20 weight percent.

5. The process of claim 4 wherein the activated alumina is derived by calcination of an alumina hydrate precursor having a major amount of alumina trihydrate.

6. The process of claim 1 wherein the alkylatable aromatic is a methyl benzene.

7. The process of claim 6 wherein the methyl benzene is xylene.

TABLE I
[Standard Conditions: 700° F., 100 p.s.i.g., 0.25 WHSV]

| Example | I | II | III |
|---|---|---|---|
| Run No. | 956–86 | 1,063–54 | 1,122–30. |
| Hrs. on Stream | | | |
| Catalyst | H₃PO₄ on kieselguhr. | 3% B₂O₃, 5% P₂O₅, 92% Al₂O₃. | 4% B₂O₃, 6% P₂O₅, 5% Cr₂O₃, 85% Al₂O₃. |
| Diluent, Mole Ratio | | | H₂, 5/1. |
| Arom./MeOH | 1/1 | 1/1 | 1/1. |
| Carbon No. of Product | | | |
| Methanol Utilization | 50 | 51 | 34. |
| Carbon on Catalyst, Wt. Percent. | Not measurable | 1.87 | 0.80. |

When an aromatic and methanol are processed over phosphoric acid on kieselguhr under methylation conditions high methanol utilization are obtained but the catalyst has several disadvantages, i.e. the catalyst is non-regenerable, loss of phosphorus pentoxide and the need for continued replacement and operation at low temperatures to avoid volatilization of the phosphorus pentoxide.

References Cited by the Examiner

UNITED STATES PATENTS 2,500,197  3/50  Michael et al. _____ 260—671
2,542,190  2/51  Gorin et al. _____ 260—671
2,777,007  1/57  Skinner et al. _____ 260—671

ALPHONSO D. SULLIVAN, *Primary Examiner.*